United States Patent [19]

Petkovski

[11] Patent Number: 5,755,181
[45] Date of Patent: May 26, 1998

[54] ELECTRO-MECHANICAL CAT LITTER BOX

[76] Inventor: Cane Petkovski, P.O. Box 152, Pickering, Ontario, Canada, L1V 2R4

[21] Appl. No.: 532,938

[22] Filed: Sep. 22, 1995

[51] Int. Cl.$^6$ .................................................. A01K 1/035
[52] U.S. Cl. .................................... 119/163; 119/165
[58] Field of Search .................................. 119/163, 164, 119/165, 170, 417, 418, 419, 421, 500

[56] References Cited

U.S. PATENT DOCUMENTS

| | | | |
|---|---|---|---|
| 4,696,257 | 9/1987 | Neary et al. | 119/500 |
| 5,140,948 | 8/1992 | Roberts | 119/165 |
| 5,315,964 | 5/1994 | Mimms et al. | 119/500 |
| 5,511,513 | 4/1996 | Baron et al. | 119/163 |
| 5,564,364 | 10/1996 | Kovacs et al. | 119/163 |

FOREIGN PATENT DOCUMENTS

94/07359  4/1994  WIPO .................................. 229/500

*Primary Examiner*—Robert P. Swiatek
*Assistant Examiner*—Elizabeth Shaw
*Attorney, Agent, or Firm*—Dowell & Dowell

[57] ABSTRACT

An electro-mechanical animal waste container for deodorizing fumes from animal waste is disclosed. The container includes an open frame, a tray, a fume hood and a sensor. The frame has a base and the tray is positioned therein. The tray is for receiving animal waste. The fume hood is attached to the frame and is spaced above the tray. The fume hood has an outlet port formed therein. A fan is positioned in the fume hood such that the fan draws the fumes from the tray into the fume hood and toward the outlet port. The sensor determines when there is an animal in the tray. A control circuit is operably connected to the sensor and the fan wherein when the sensor detects an animal in the tray the fan is switched on after a preselected amount of time and then after a second preselected amount of time the fan is switched off. Preferably a filter is positioned over the outlet port and is for deodorizing air that passes therethrough. Preferably a second filter is positioned at the bottom of fume hood.

20 Claims, 5 Drawing Sheets

ELECTRO-MECHANICAL CAT LITTER BOX

FIELD OF THE INVENTION

This invention relates to animal waste containers and in particular to cat litter boxes that include a method of deodorizing the fumes from the litter.

BACKGROUND OF THE INVENTION

Domestic animals are very common. With the joys of having a domestic animal comes the care and maintenance of that animal. For some domestic animals, in particular cats, a container or litter box is provided for the cat to leave its waste. The disadvantage of a litter box is that it will often smell. Accordingly it is desirable to provide a litter box that will deodorize the fumes that emanate from the litter box.

A number of solutions for the smelly litter box problem have been proposed. For example easily disposable litter boxes have been suggested so that the animal owner need never contact any animal waste and the litter can be changed often and easily. However over time this can become costly if the owner is continually disposing of cat litter, box and all. This disadvantage is addressed in Canadian patent 1,264,256 issued Jan. 9, 1990 to Muzzey wherein the cost of the litter and the box is designed to be only marginally greater than the litter on its own. However, this does not address the odor problem often associated with litter.

Other solutions include providing fully enclosed boxes with one opening therein for the cat to enter and exit, in an attempt to contain the odors that often emanates therefrom. Two such examples are shown in U.S. Pat. No. 4,352,340 issued to Strubelt on Oct. 5, 1982 and U.S. design Pat. No. 331,649 issued to Saja on Dec. 8, 1992. The Strubelt patent discloses a container with a hole in the side thereof, a removable lid and a bag therein with a clamping mechanism to secure the bag around the hole. The Saja design patent shows an enclosed cat litter box which is designed to look somewhat like a house and is decorated with cat paw prints. The drawback with these designs is that many cats are not prepared to enter and use an enclosed litter box.

Accordingly it is desirable to provide a waste container or litter box that most cats would use and which can deodorize the fumes from the litter to avoid frequent changes of litter.

SUMMARY OF THE INVENTION

The present invention is an electro-mechanical animal waste container for deodorizing fumes from animal waste. The container includes an open frame, a tray, a fume hood and a sensor. The frame has a base and the tray is positioned therein. The tray is for receiving animal waste. The fume hood is attached to the frame and is spaced above the tray. The fume hood has an outlet port formed therein. A fan is positioned in the fume hood such that the fan draws the fumes from the tray into the fume hood and toward the outlet port. The sensor determines when there is an animal in the tray. A control system is operably connected to the sensor and the fan wherein when the sensor detects an animal in the tray the fan is switched on after a preselected amount of time and then after a second preselected amount of time the fan is switched off. Preferably a filter covers the outlet port and a second filter covers the bottom portion of the fume hood.

Further features of the invention will be described or will become apparent in the course of the following detailed description.

BRIEF DESCRIPTION OF THE DRAWINGS

The invention will now be described, by way of example only, with reference to the accompanying drawings, in which.

DETAILED DESCRIPTION OF THE INVENTION

Figure 1:
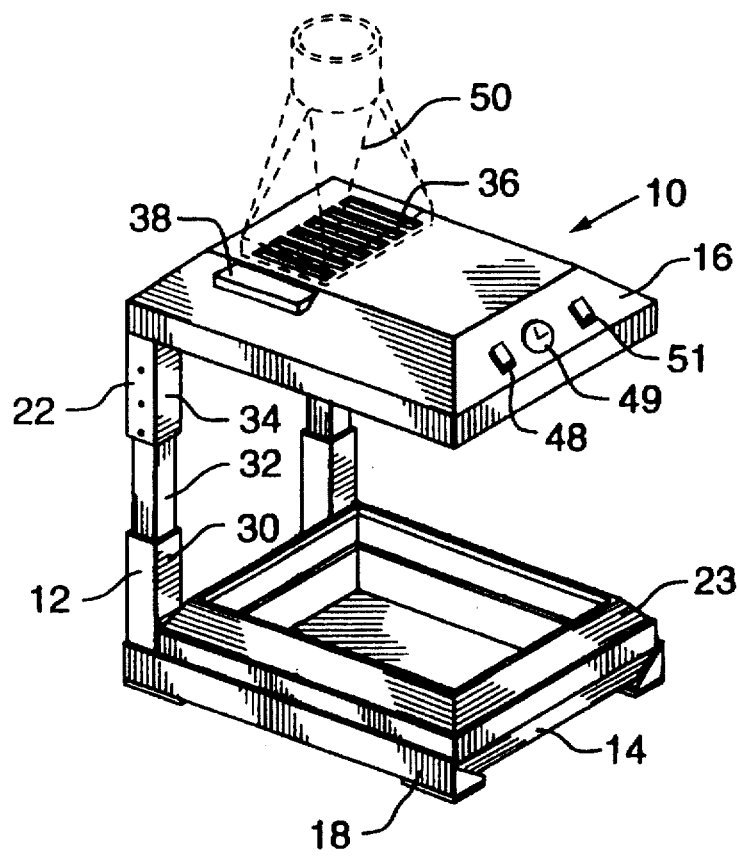
FIG. 1 is a perspective view of an electro-mechanical cat litter box constructed in accordance with the present invention.

Referring to the drawings an electro-mechanical cat litter box of the present invention is shown generally at 10. Litter box 10 includes a frame 12 with a removable litter tray 14 and a fume hood 16.

Frame 12 has a base 18 for receiving the removable tray 14, a rim 23 for keeping the tray 14 in position and a pair of adjustable vertical support members 22 for supporting the fume hood 16. Tray 14 is be provided with a bag 15, shown in FIGS. 5 and 7. Bag 15 covers the bottom of tray 14. Litter 17 is positioned inside bag 15. Bag 15 allows for easy disposal of litter 17.

Base 18 has a pair of arms 24 that extend outwardly from support members 22 and are attached thereto. A cross member 26 connects support member 22.

Figure 5:
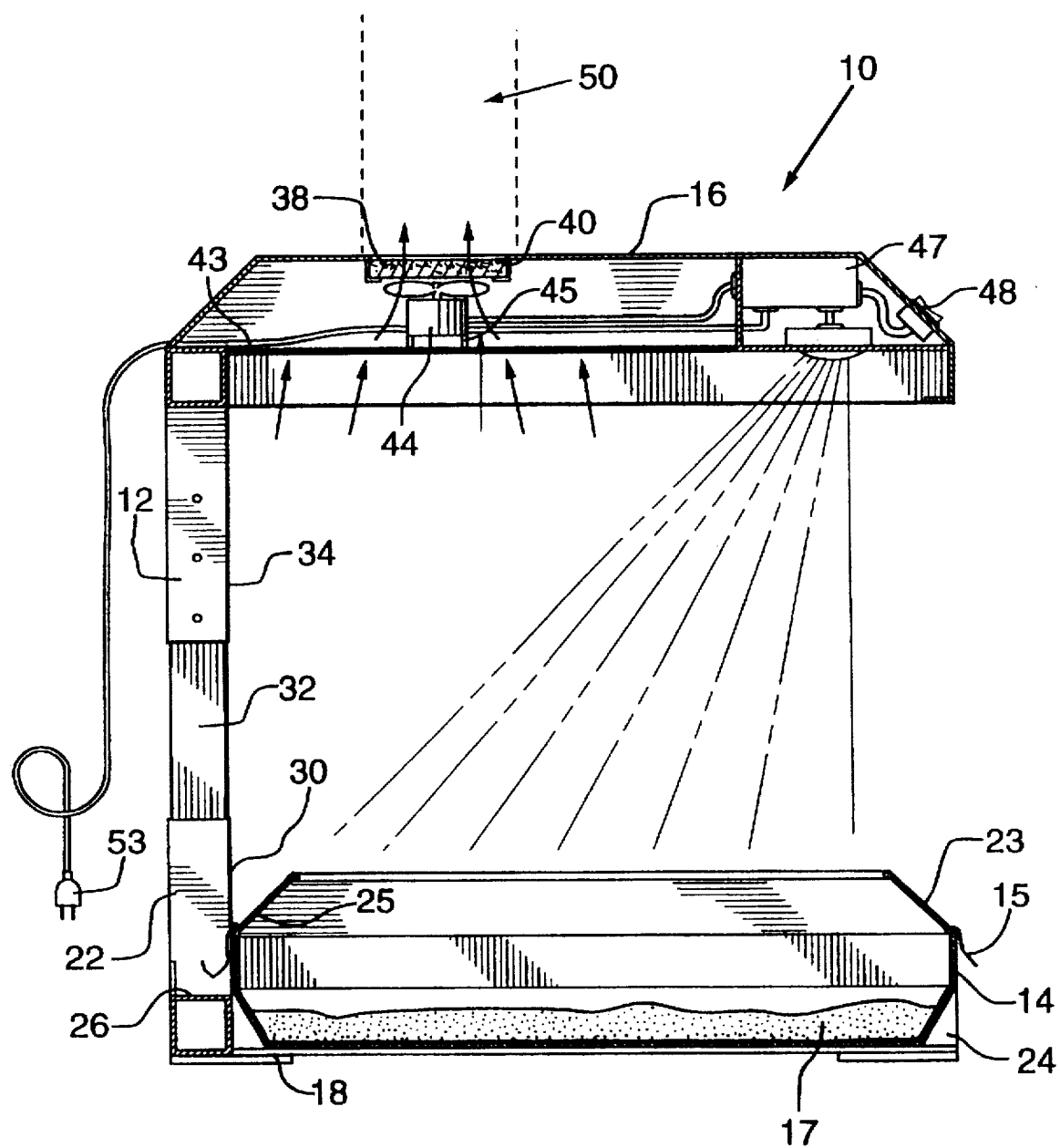
FIG. 5 is a sectional view taken along line 5—5 of FIG. 3.
Figure 6:
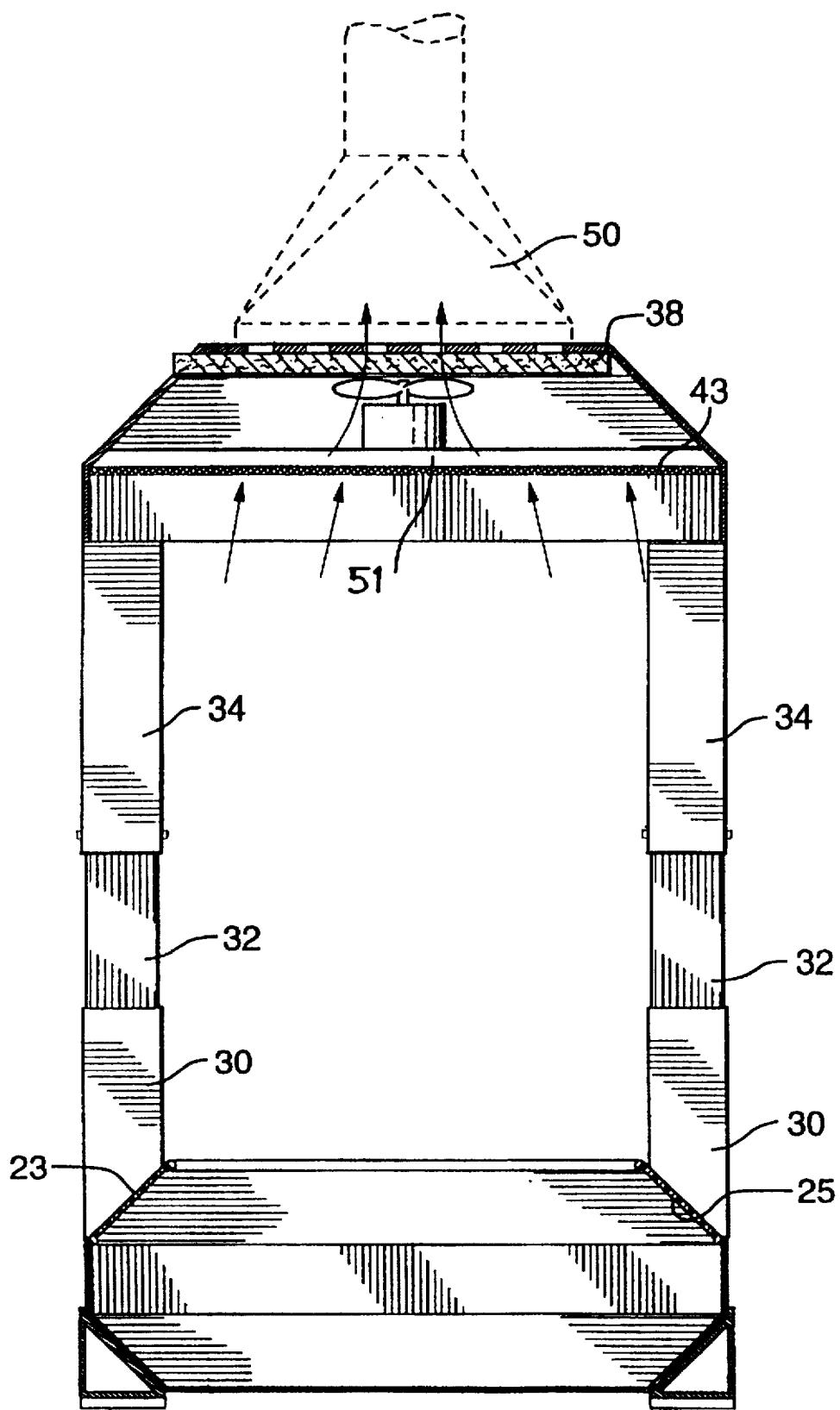
FIG. 6 is a sectional view taken along line 6—6 of FIG. 4.

Rim 23 is spaced above base 18 and is hingably attached to support members 22. Rim 23 is dimensioned to fit over and slightly inside tray 14 when it is in position, as shown in FIGS. 5 and 6. When in position, as shown in FIG. 1, rim 23 extends upwardly from the tray and has an inner portion 25 which slopes outwardly and downwardly, as best seen in FIGS. 5 and 6. Rim 23 keeps tray 14 in position and helps to inhibit the cat liner 17 from being pushed out of tray 14 when a cat covers its waste.

Each adjustable vertical support member 22 has a tubular lower portion 30, a tubular intermediate portion 32 and a tubular upper portion 34. Intermediate portion 32 fits snugly and slidably inside lower portion 30 and upper portion 34. Adjustable vertical support members 22 are easily adjustable so that fume hood 16 may be positioned at a desirable height for cats of different sizes.

Figure 7:
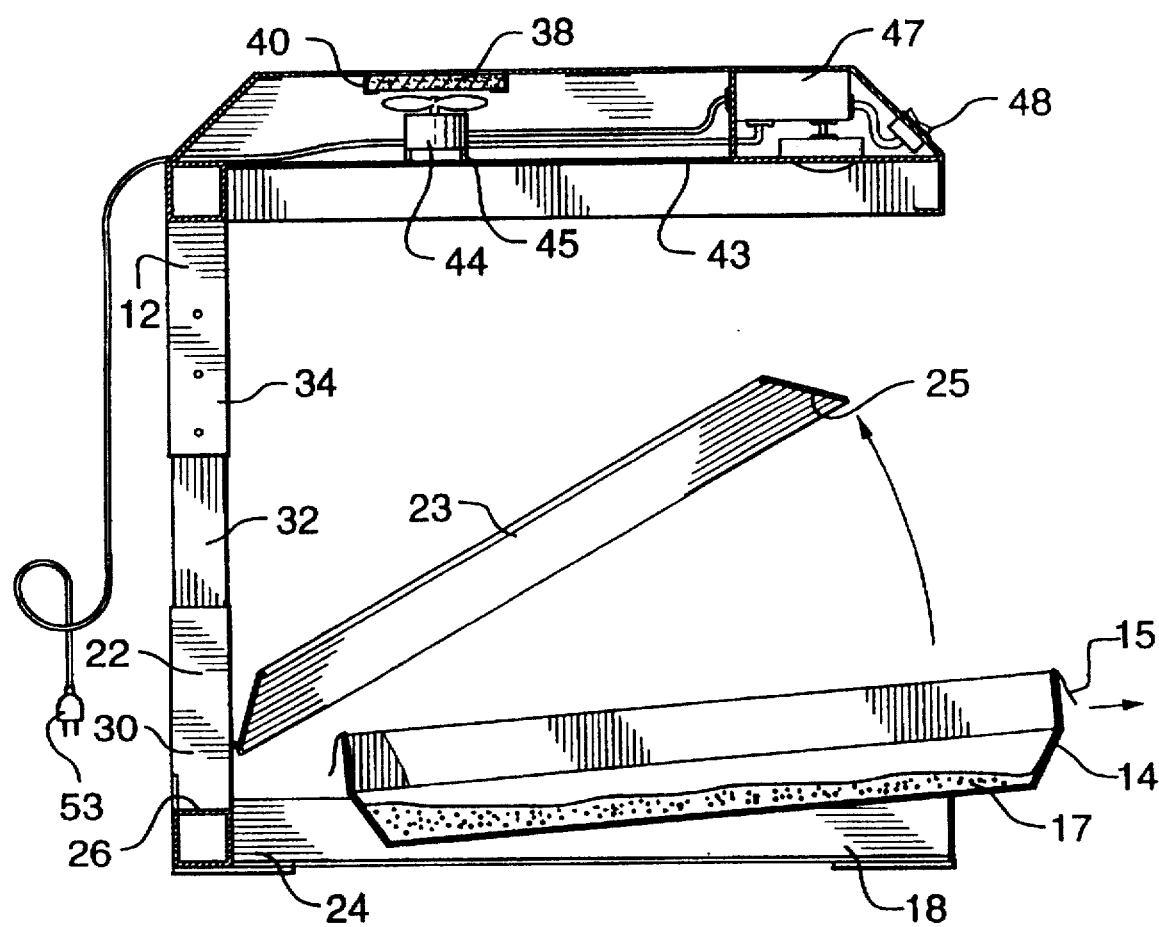
FIG. 7 is a section view similar to FIG. 5 showing the litter tray partially removed.

Fume hood 16 is connected to tubular upper portion 34 of adjustable vertical support members 22 and is positioned above the tray 14. Fume hood 16 is generally the same size and shape as tray 14. As best seen in FIGS. 5, 6 and 7, fume hood 16 includes a slotted outlet port or grill 36, a filter 38, a fan 44 and a sensor 46.

Filter 38 is positioned on the interior of the fume hood and positioned to cover the outlet port or grill 36 on the inside. Filter 38 is chosen such that air passing therethrough will be deodorized. For example an activated charcoal filter may be used. A channel 40 (FIGS. 5 and 7) is formed in the interior of fume hood 16 to receive filter 38. Fume hood 16 has an aperture 42 (FIG. 6) contiguous with channel 40 so that filter 38 can be easily changed from the outside of fume hood 16. A second filter 43 covers the bottom portion of fume hood 16. Second filter 43 is a mesh filter and it protects the fan from dust, hair balls and the like. Preferrably second filter 43 is washable.

Fan 44 is positioned in fume hood 16 below outlet port or grill 36 and filter 38. Fan 44 is chosen such that it can draw the air from the tray into the fume hood toward outlet port or grill 36 as shown by arrows 51 in FIGS. 5 and 6. Fan 44 is held in position by brackets 45.

Figure 2:
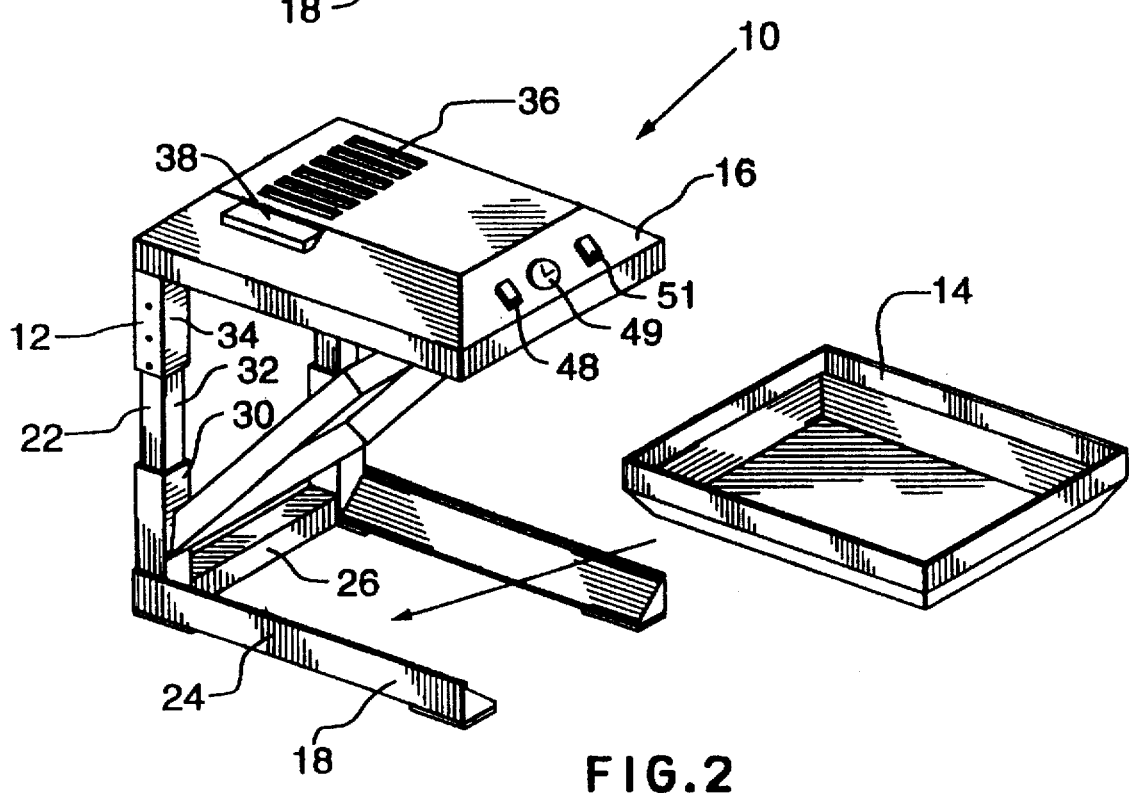
FIG. 2 is a perspective view of the electro-mechanical cat litter box shown in FIG. 1 showing the tray removed.
Figure 3:
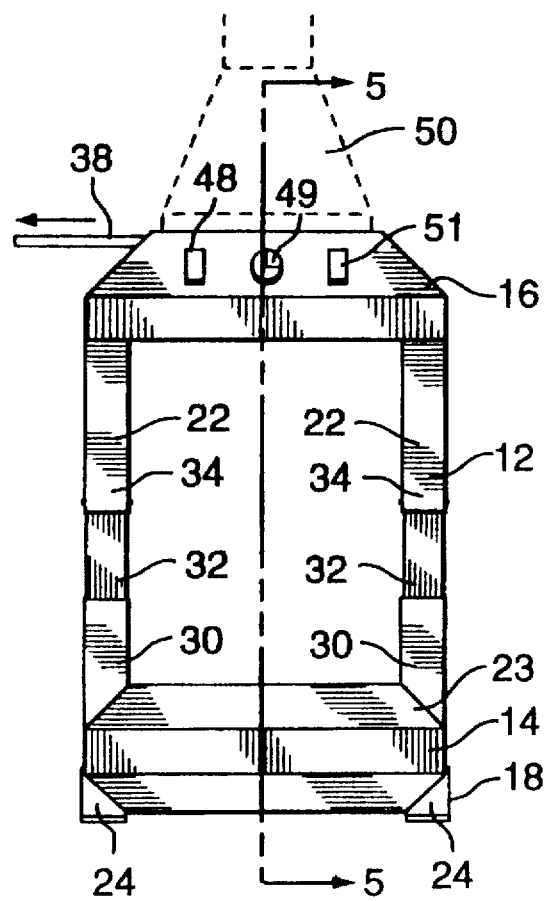
FIG. 3 is an end elevational view of the electro-mechanical cat litter box of FIG. 1.
Figure 4:
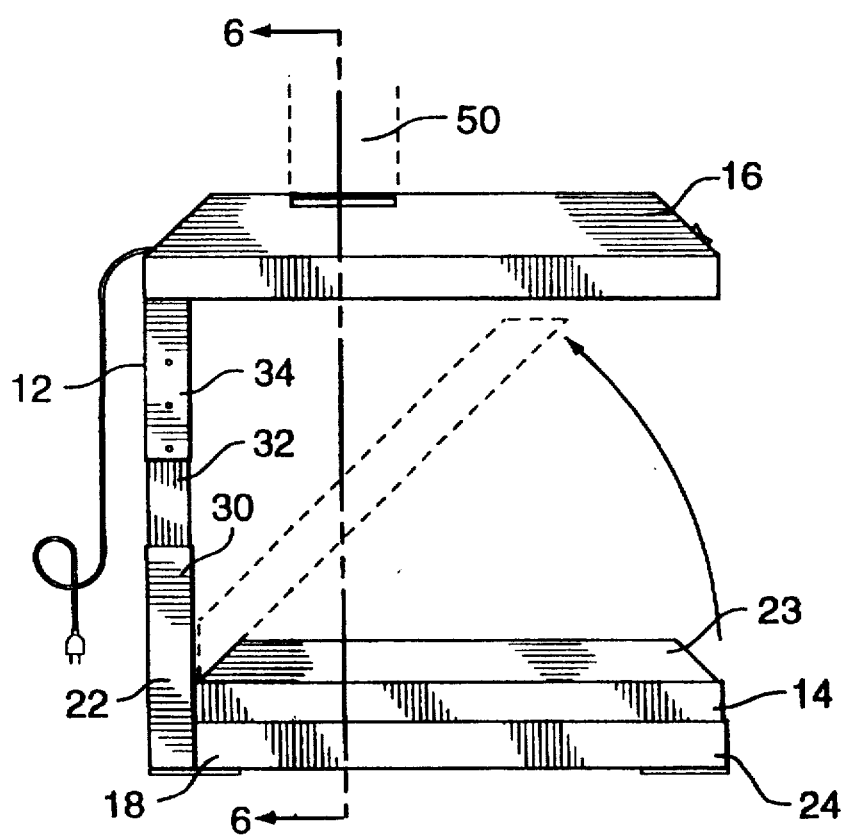
FIG. 4 is a side elevational view of the electro-mechanical cat litter box of FIG. 1.

Referring to FIG. 5 and 7, sensor 46 is operably connected a standard control circuit 47 which in turn is operably connected to fan 44 and on/off switch 48. Preferably sensor 46 is a motion sensor. Referring to FIG. 5, sensor 46, a motion sensor, is configured and positioned such that it will detect when an object enters tray 14. Preferably control circuit switches on fan 44 after a time delay from the time an object is detected by sensor 46. The time delay is set to allow a cat enough time to complete its use of the litter box and leave the litter box before fan 44 is switched on. The control circuit 47 also switches off fan 44 after a preselected amount of time. The preselected amount of time is set by dial 49 (shown in FIGS. 1 and 2) which is operably connected to control circuit 47. On/off switch 48 allows the user to turn box 10 off when it is not in use. On/off switch 48 is operably connected to control circuit 47. LED light 51 is operably connected to control circuit 47 and indicates when box 10 is on. As shown in FIGS. 5 and 7 control circuit 47 is operably connected to a plug 53 which connects box 10 to a conventional wall socket (not shown). Alternatively box 10 could be battery operated.

Alternatively sensor 46, a motion sensor, may be configured to detect when there is motion in the tray and detects thereafter when there is no motion in the tray and fan 44 is switched on when no motion is detected. The fan 44 will then be switched off after a preselected amount of time.

An other alternative is that an infrared body heat sensor could be used for sensor 46. The sensor being configured to detect the presence of an animal in the litter box.

Optionally a hose 50, shown in phantom in FIGS. 1, 3, 4, 5 and 6, is fitter over outlet port 36 and is connected to a vent (not shown) which can vent the air to the outside of the house.

It will be appreciated that the above description related to ono embodiment by way of example only. Many variations on the invention will be obvious to those skilled in the art and such obvious variations are within the scope of the invention as described herein whether or not expressly described.

What is claimed as the invention is:

1. An electro-mechanical waste container for animals comprising:
   an open frame having a base and a vertical support extending upwardly from the base;
   a tray positioned in the base for receiving animal waste;
   a fume hood attached to and extending outwardly from the vertical support of the frame and spaced above and over the tray and having an outlet port formed therein and being substantially open between the fume hood and the base;
   a fan positioned in the fume hood to draw fumes from the tray into the fume hood and toward the outlet port;
   a sensor for determining when there is an animal in the tray; and
   a control circuit operably connected to the sensor and the fan wherein when the sensor detects an animal in the tray the fan is switched on after a preselected amount of time and then after a second preselected amount of time the fan is switched off.

2. An electro-mechanical animal waste container according to claim 1 wherein the sensor is motion sensor.

3. An electro-mechanical animal waste container according to claim 2 further including a filter positioned over the outlet port.

4. An electro-mechanical animal waste container according to claim 3 further including a hose attachable to outlet port.

5. An electro-mechanical animal waste container according to claim 2 wherein the motion sensor detects when there is motion in the tray and detects thereafter when there is no motion in the tray and the control circuit switches on the fan when no motion is detected.

6. An electro-mechanical animal waste container according to claim 1 wherein the sensor is a heat sensor.

7. An electro-mechanical animal waste container according to claim 6 wherein the heat sensor is an infrared body hear sensor.

8. An electro-mechanical animal waste container according to claim 1 further including a filter positioned over the outlet port.

9. An electro-mechanical waste container for animals comprising:
   a frame having a base;
   a tray positioned in the base for receiving animal waste;
   a fume hood attached to the frame and spaced above the tray and having an outlet port formed therein and a bottom portion;
   a fan positioned in the fume hood to draw fumes from the tray into the fume hood and toward the outlet port;
   a motion sensor for determining when there is an animal in the tray.
   a control circuit operably connected to the sensor and the fan wherein when the sensor detects an animal in the tray the fan is switched on after a preselected amount of time and then after a second preselected amount of time the fan is switched off;
   a first filter positioned over the outlet port; and
   a second filter positioned in the bottom portion of the fume hood.

10. An electro-mechanical animal waste container according to claim 9 wherein the tray is removable.

11. An electro-mechanical animal waste container according to claim 10 further including a bag that can be placed around the removable tray for receiving animal waste.

12. An electro-mechanical animal waste container according to claim 11 further including an on/off switch operably attached to the control circuit.

13. An electro-mechanical animal waste container according to claim 12 wherein the space between the tray and the fume hood is adjustable.

14. An electro-mechanical animal waste container according to claim 13 wherein a channel and contiguous aperture is formed in fume hood for slidably receiving the filter such that the filter is easily removable and replaceable.

15. An electro-mechanical animal waste container according to claim 14 further comprising a rim hingably attached to the frame and spaced above the tray wherein the rim is dimensioned to fit over the tray.

16. An electro-mechanical animal waste container according to claim 15 wherein the rim has an inner portion that slopes downwardly and outwardly such that something that lands thereon will slide back into the tray.

17. An electro-mechanical waste container for animals comprising:
   a frame having a base;
   a tray positioned in the base for receiving animal waste;

a fume hood attached to the frame and spaced above the tray and having an outlet port formed therein and a bottom portion;

a fan positioned in the fume hood to draw fumes from the tray into the fume hood and toward the outlet port;

a sensor for determining when there is an animal in the tray;

a control circuit operably connected to the sensor and the fan wherein when the sensor detects an animal in the tray the fan is switched on after a preselected amount of time and then after a second preselected amount of time the fan is switched off;

a first filter positioned over the outlet port; and a second filter positioned in the bottom portion of the fume hood.

18. An electro-mechanical animal waste container according to claim 17 wherein the tray is removable.

19. An electro-mechanical animal waste container according to claim 18 further including a bag that can be placed around the removable tray for receiving animal waste.

20. An electro-mechanical animal waste container according to claim 19 wherein the space between the tray and the fume hood is adjustable.

\* \* \* \* \*